United States Patent [19]

Ito

[11] Patent Number: 4,984,877
[45] Date of Patent: Jan. 15, 1991

[54] HIGH ZOOM-RATIO/ZOOM LENS SYSTEM FOR USE IN A COMPACT CAMERA

[75] Inventor: Takayuki Ito, Tokyo, Japan

[73] Assignee: Asahi Kogaku Kogyo Kabushiki Kaishi, Tokyo, Japan

[21] Appl. No.: 535,234

[22] Filed: Jun. 8, 1990

Related U.S. Application Data

[63] Continuation of Ser. No. 328,265, Mar. 24, 1989, abandoned.

[30] Foreign Application Priority Data

Mar. 25, 1988 [JP] Japan ................................ 63-71226

[51] Int. Cl.$^5$ ............................................. G02B 15/00
[52] U.S. Cl. ..................................... 350/423; 350/481
[58] Field of Search ............... 350/454, 458, 423, 426, 350/481

[56] References Cited

U.S. PATENT DOCUMENTS 4,720,179  1/1988  Ito .

FOREIGN PATENT DOCUMENTS

56-128911  1/1981  Japan .
57-201213  3/1982  Japan .
58-184916 10/1983  Japan .
60-57814   1/1985  Japan .
62-78522   2/1985  Japan .
62-264019  2/1987  Japan .
62-90611   4/1987  Japan .
62-113120  9/1987  Japan .
2184865    1/1982  United Kingdom .

Primary Examiner—Paul M. Dzierzynski
Attorney, Agent, or Firm—Sughrue, Mion, Zinn, Macpeak & Seas

[57] ABSTRACT

A high zoom ratio zoom lens system for use in a compact camera that has reduced variations in field curvature over the full zooming range. The lens system includes, in order from the object side, a first lens group having a positive focal length and a second lens group having a negative focal length, and which performs zooming by adjusting the distance between the two lens groups. In accordance with the invention, the first lens group is composed of a first lens subgroup having a small power and a second lens subgroup having a positive focal length. The distance between the two subgroups is increased during zooming from a wide-angle end to a middle-angle position and decreased during zooming from the middle-angle position to the narrow-angle end.

6 Claims, 9 Drawing Sheets

HIGH ZOOM-RATIO/ZOOM LENS SYSTEM FOR USE IN A COMPACT CAMERA

This is a continuation of application Ser. No. 07/328,265 filed Mar. 24, 1989, now abandoned.

BACKGROUND OF THE INVENTION

The present invention relates to a zoom lens system. In particular, the invention relates to a zoom lens system having a high zoom ratio and which is suitable for use in a compact camera and hence is subject to smaller back focus constraints than a zoom lens system for use in a single-lens reflex camera.

The following four types of zoom lens systems have conventionally been used in compact cameras:

(I) A two-group system of the telephoto type composed of a first lens group having a positive focal length and including a diaphragm stop and a second lens group having a negative focal length. Such lens systems are disclosed in Unexamined Published Japanese Patent Applications Nos. 56-128911, 57-201213, 62-90611, 62-264019 and 62-113120.

(II) A three-group system that is a modification of the two-group system (I) and which is composed of a first lens group having a positive focal length and including a diaphragm stop, a second lens group having a positive focal length, and a third lens group having a negative focal length. Such a lens system is disclosed in Unexamined Published Japanese Patent Application No. 58-184916.

(III) A four-group system composed of a first lens group having a positive focal length, a second lens group having a negative focal length, a third lens group having a positive focal length and a fourth lens group having a negative focal length. Such a lens system is disclosed in Japanese Unexamined Patent Application No. 60-57814.

(IV) A three-group system which is a modification of the four-group system (III) in that the second and third lens groups are integrated into a single group. Such a lens system is disclosed in Japanese Unexamined Patent Application No. 62-78522.

The above-described conventional zoom lens systems, however, have certain problems as discussed below.

The two-group system (I) has been the subject of active studies and many versions of it have been proposed. Although it features a very simple lens (optical) composition, this type of zoom lens system suffers from the disadvantage that the first and second lens groups, especially the second lens group, have to be moved by a large amount during zooming, causing difficulty in designing an efficient mechanical structure.

The three-group system (II) differs from the two-group system (I) only in that the first lens group is divided into two positive units and in that the amount of lens movement required is no smaller than in the first type.

The four-group system (III) features a smaller amount of lens movement than the first two types. However, because of the complex structure due to the use of the four lens groups and on account of the high lens power presented by individual lens groups, especially the second and third lens groups, poor workmanship in lens manufacture can cause substantial adverse effects on system performance. Hence, utmost care must be exercised in the process of lens manufacture.

The three-group system (IV) requires as small an amount of lens movement as in the four-group system (III). However, if poor workmanship occurs in lens manufacture, this system will suffer a larger amount of deterioration in the performance of individual lens group types (I) and (II), although the deterioration is not as great as in type (III).

Systems (III) and (IV) have a common problem in that the lenses in the first group are larger in diameter than in systems (I) and (II).

With a view to solving these problems, the assignee of the present invention previously proposed several versions of system (I) that featured a smaller lens length in spite of increased back focus and which also succeeded in reducing the required amount of lens movement compared to other two-group type zoom lens systems by increasing the powers of individual lens groups, particularly, by increasing the negative power of the second lens group to reduce its required amount of movement. An example of this type of system is described in the above-mentioned Application No. 62-264019. However, as for the zoom ratio, none of the conventional types (I)–(IV) are able to attain values of two or over and the only exceptions are the versions set forth in Examples 5, 6 and 7 of Application No. 62-264019.

However with the zoom lens system proposed in Application No. 62-264019, if an attempt is made to reduce the overall length of the system and the necessary amount of movement of each lens group while maintaining an increased back focus, field curvature will be undercompensated at middle-angle positions and overcompensated at the narrow-angle end. In short the two-group system of Application No. 62-264019 has suffered from the disadvantage that great variations in field curvature occur during zooming.

SUMMARY OF THE INVENTION

The present invention has been accomplished to solve the problems of the zoom lens system described in Application No. 62-264019 based upon extensive studies to improve the many previously known two-group zoom lens systems.

The system of the present invention is optically similar to conventional type (I), but in terms of zooming method, it is adapted from the two-group type (I) and is mechanically similar to the conventional type (II).

By virtue of the invention, a zoom lens system has been successfully provided for use in a compact camera that has an increased back focus and which yet is reduced in overall length and is capable of attaining a zoom ratio greater than 2.0.

The principal object of the present invention is to provide a high zoom-ratio zoom lens system for use in a compact camera that experiences smaller variations in field curvature over the full zooming range.

The above-stated object of the present invention can generally be attained by a high zoom-ratio zoom lens system for use in a compact camera which comprises, in order from the object side, a first lens group having a positive focal length and a second lens group having a negative focal length, and which performs zooming by adjusting the distance between the two lens groups. To state the characteristics of this lens system more specifically, the first lens group is composed of a first lens subgroup 1a having a small power and a second lens subgroup 1b having a positive focal length, and the distance between these two subgroups is increased during zooming from the wide-angle end to a middle-angle position to the narrow-angle end.

In a preferred embodiment, the zoom lens system of the present invention satisfies the following condition:

$$|f_S/f_{1a}| < 0.5 \quad (1)$$

where $f_S$ is the focal length of the overall system at the wide-angle end and $f_{1a}$ is the focal length of the lens subgroup 1a.

In another preferred embodiment, the inventive zoom lens system further satisfies the following condition:

$$|\Delta|/f_S < 0.1 \quad (2)$$

where $\Delta$ is the maximum value of the change in the distance between lens subgroups 1a and 1b.

In a further preferred embodiment, the lens subgroup 1a is composed of, in order from the object side, a positive meniscus lens element having a convex surface of large curvature directed toward the object, a negative lens element having a concave surface of large curvature directed toward the object, and a positive meniscus lens element having a convex surface of large curvature directed toward the image plane.

In a still further preferred embodiment, the lens subgroup 1b is a cemented positive lens having a divergent surface of large power which is composed of a biconvex positive lens element and a negative meniscus lens element having a concave surface of large curvature directed toward the object.

In yet another preferred embodiment, the second lens group is composed of, in order from the object side, a positive lens element having a convex surface of large curvature directed toward the image plane and two negative meniscus lens elements having a concave surface of large curvature directed toward the object.

BRIEF DESCRIPTION OF THE DRAWINGS

In each of FIGS. 1, 5 and 9, the arrows indicate movement of the first and second lens subgroups of the first lens group and the second lens group along the optical axis during zooming.

DESCRIPTION OF THE PREFERRED EMBODIMENTS

As discussed above, if an attempt is made to reduce the overall length of a two-group zoom lens system for use in a compact camera that is capable of attaining a zoom ratio higher than 2.0, field curvature is undercompensated at middle-angle positions, whereas it is overcompensated at the narrow-angle end.

In order to solve this problem in the zoom lens system of the present invention, the known two-group type system is modified in such a way that the first lens group is composed of, in order from the object side, a first lens subgroup 1a having a positive or negative focal length on the image side. During zooming from the wide-angle end to a middle-angle position the distance between subgroups 1a and 1b is increased, and during zooming from the middle-angle position to the narrow-angle end, this distance is decreased. In this way, zooming can be performed over the full range with field curvature being effectively compensated to reduce the amount of variation.

To explain the mechanism behind this phenomenon more specifically, the relative distance between the divergent surface of the lens subgroup 1a and that of the lens subgroup 1b is varied by adjusting the distance between the two lens subgroups, and as a result the height at which extra-axial rays intercept the divergent surfaces is changed in such a way as to enable efficient control over field curvature.

Since the height at which axial rays intercept the divergent surfaces is held practically constant, there will occur little variation in spherical aberration even if the distance between lens subgroups 1a and 1b is changed.

The various conditions set forth above which are to be satisfied by the zoom lens system of the present invention are described below more specifically.

Condition (1) relates to the power of the first lens subgroup 1a in the first lens group. Lens subgroup 1a preferably has a small power in order to reduce its sensitivity to poor workmanship during lens manufacture. If condition (1) is not satisfied, the power of lens subgroup 1a is increased and it becomes so sensitive to poor workmanship in lens manufacture that the production rate will be reduced due to large variations in the quality of the manufactured lenses.

As a further problem, reasonably reproducible results can not be attained in the movement of the focal point during autofocusing or zooming.

Condition (2) relates to the amount of movement of the distance between lens subgroups 1a and 1b. If this condition is not satisfied, field curvature will be overcompensated at middle-angle positions.

As already discussed above, the preferred lens composition of the system of the present invention is such that subgroup 1a is of a three-unit three-element composition, subgroup 1b of a one-unit two-element composition, and the second lens group of a three-unit two-element composition, and the second lens group of a three-unit three-element composition. Since subgroup 1b is made of a cemented positive lens having a divergent surface of large power, it serves to maintain good lens performance over the entire zooming range even if the positive power of the first lens group is sufficiently increased to realize a compact lens system. The presence of two negative meniscus lens elements on the image side of the second lens group has the advantage of enabling its negative power to be increased significantly, which leads to a reduction in the amount of movement of the second lens group. In addition this arrangement is effective in reducing distortion which would otherwise occur at high zoom ratio.

EXAMPLES

Examples 1-3 of the present invention are described in the tables below in which $F_{NO}$ signifies the F number, f represents focal length, Z represents the zoom ratio, $\omega$ represents the half viewing angle, $f_B$ represents the back focus, r represents the radius of curvature of an individual lens surface, d represents the lens thickness or the aerial distance between lens surfaces, N represents the refractive index of an individual lens at the d-line, and $\nu$ represents the Abbé number of an individual lens.

EXAMPLE 1

Figure 1:
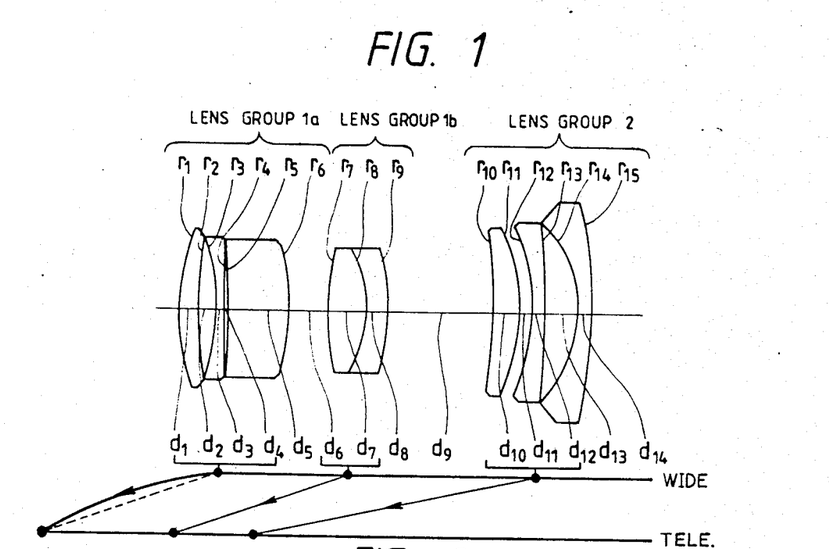
FIG. 1 is a simplified cross-sectional view of a zoom lens system at the wide-angle end constructed in accordance with an Example 1 of the present invention.
Figure 2:
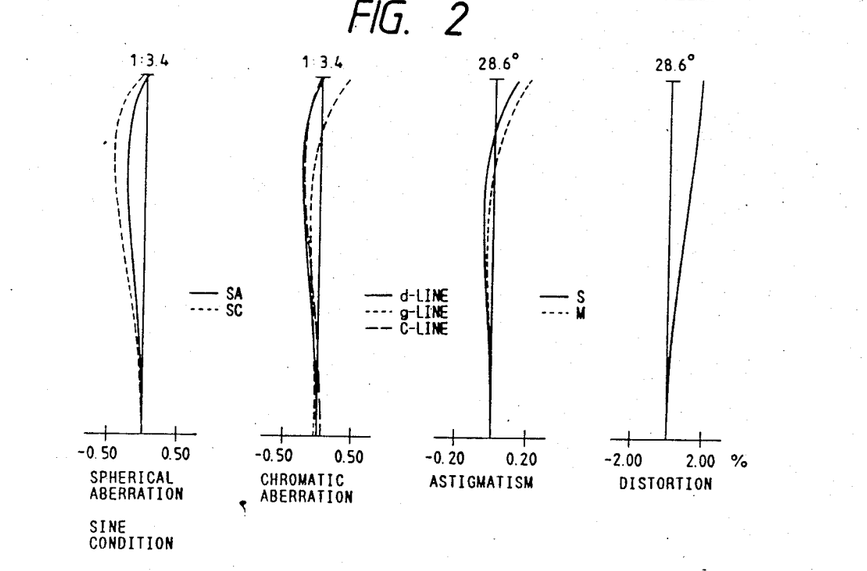
FIG. 2 is a graph plotting aberration curves obtained with the zoom lens system of Example 1 at the wide-angle end.
Figure 3:
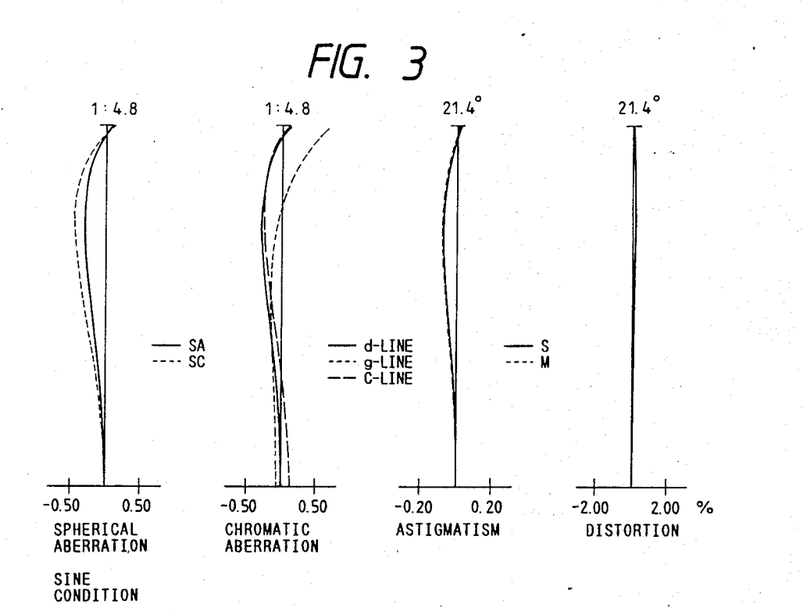
FIG. 3 is a graph plotting aberration curves obtained with the zoom lens system of Example 1 at a middle-angle position.
Figure 4:
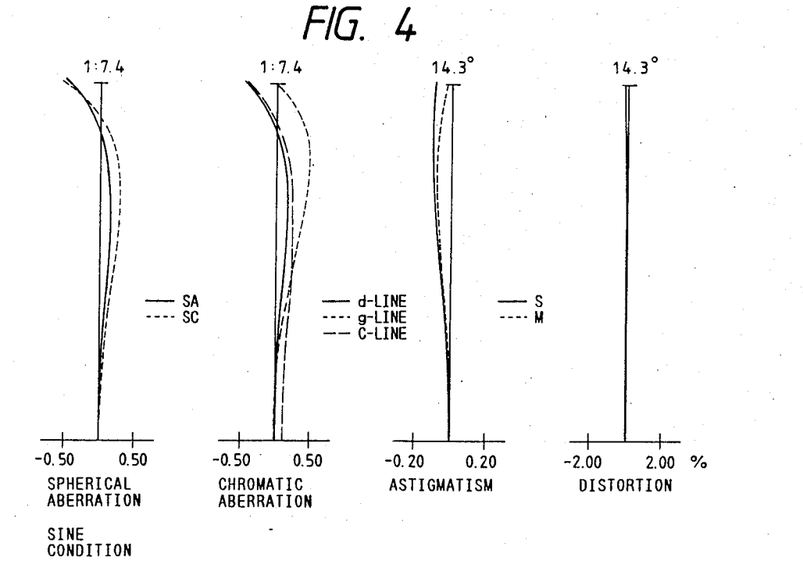
FIG. 4 is a graph plotting aberration curves obtained with the zoom lens system of Example 1 at the narrow-angle end.

$F_{NO}=1:3.4\sim4.8\sim7.4$
$f=39.00\sim55.04\sim84.99$
$Z=2.18$
$\omega=28.6\sim21.4\sim14.3$
$f_B=9.97\sim24.12\sim50.70$

| Surface No. | r | d | N | $\nu$ |
|---|---|---|---|---|
| 1 | 22.040 | 2.23 | 1.51823 | 59.0 |
| 2 | 54.782 | 1.99 | | |
| 3 | −21.093 | 1.10 | 1.83400 | 37.2 |
| 4 | −332.395 | 0.35 | | |
| 5 | −63.884 | 6.80 | 1.71736 | 29.5 |
| 6 | −21.866 | 4.10~4.37~4.05 | | |
| 7 | 25.575 | 4.56 | 1.48749 | 70.2 |
| 8 | −12.175 | 2.50 | 1.80518 | 25.4 |
| 9 | −20.758 | 11.75~6.99~2.90 | | |
| 10 | −58.599 | 3.01 | 1.80518 | 25.4 |
| 11 | −18.700 | 1.31 | | |
| 12 | −21.404 | 1.30 | 1.83400 | 37.2 |
| 13 | −98.845 | 3.62 | | |
| 14 | −13.191 | 1.40 | 1.77250 | 49.6 |
| 15 | −51.714 | | | |

(1) $f_S/F_{1a}=0.172$
(2) $|\Delta|/f_S=0.0082$

EXAMPLE 2

Figure 5:
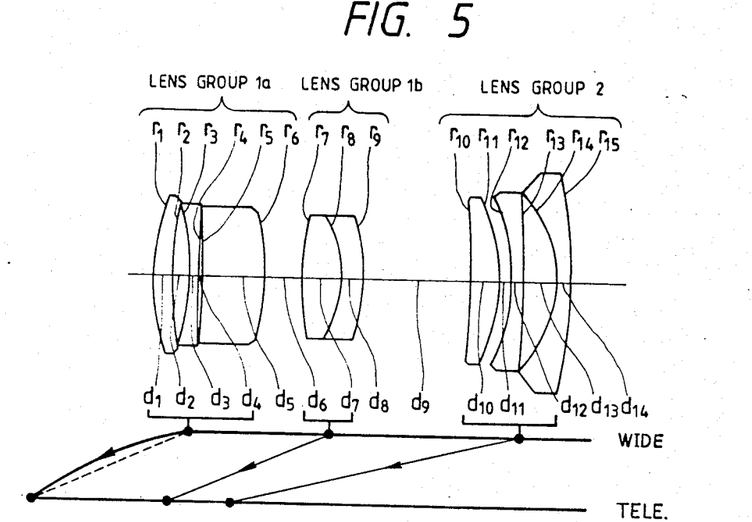
FIG. 5 is a simplified cross-sectional view of a zoom lens system at the wide-angle end constructed in accordance with an Example 2 of the present invention.
Figure 6:
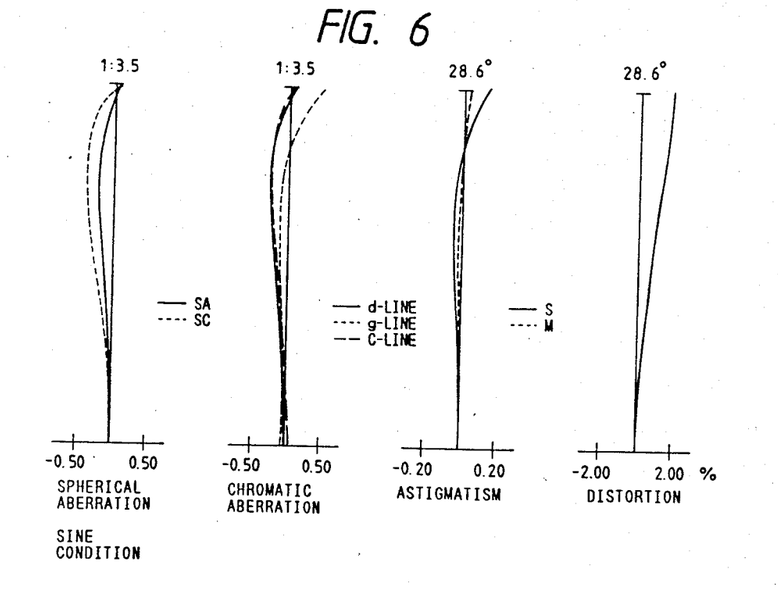
FIG. 6 is a graph plotting aberration curves obtained with the zoom lens system of Example 2 at the wide-angle end.
Figure 7:
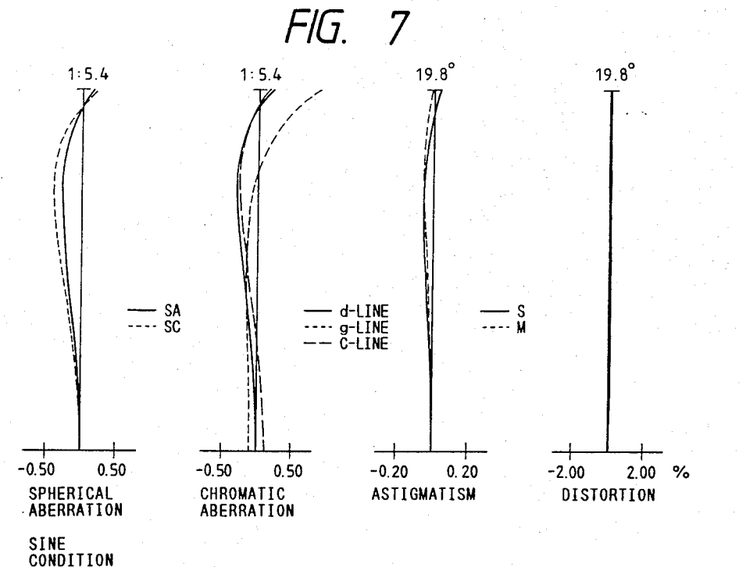
FIG. 7 is a graph plotting aberration curves obtained with the zoom lens system of Example 2 at a middle-angle position.

$F_{NO}=1:3.5\sim5.4\sim8.1$
$f=39.00\sim60.08\sim90.15$
$Z=2.31$
$\omega=28.6\sim19.8\sim13.5$
$f_B=9.85\sim28.27\sim54.66$

| Surface No. | r | d | N | $\nu$ |
|---|---|---|---|---|
| 1 | 21.174 | 2.31 | 1.48749 | 70.2 |
| 2 | 54.571 | 2.00 | | |
| 3 | −21.345 | 1.10 | 1.83481 | 42.7 |
| 4 | −593.822 | 0.39 | | |
| 5 | −61.623 | 6.80 | 1.68893 | 31.1 |
| 6 | −21.461 | 3.85~4.15~3.85 | | |
| 7 | 25.033 | 4.42 | 1.48749 | 70.2 |
| 8 | −11.895 | 2.50 | 1.80518 | 25.4 |
| 9 | −20.307 | 12.15~6.46~2.94 | | |
| 10 | −63.691 | 3.07 | 1.80518 | 25.4 |
| 11 | −18.500 | 1.30 | | |
| 12 | −20.631 | 1.30 | 1.83400 | 37.2 |
| 13 | −108.408 | 3.67 | | |
| 14 | −13.113 | 1.40 | 1.77250 | 49.6 |
| 15 | −50.254 | | | |

(1) $f_S/f_{1a}=0.127$
(2) $|\Delta|/f_S=0.0077$

EXAMPLE 3

Figure 9:
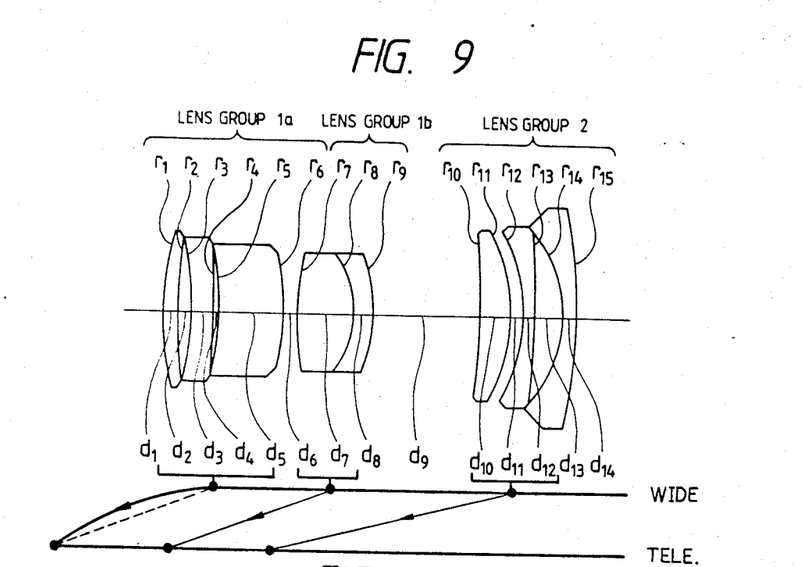
FIG. 9 is a simplified cross-sectional view of a zoom lens system at the wide-angle end constructed in accordance with an Example 3 of the present invention.
Figure 10:
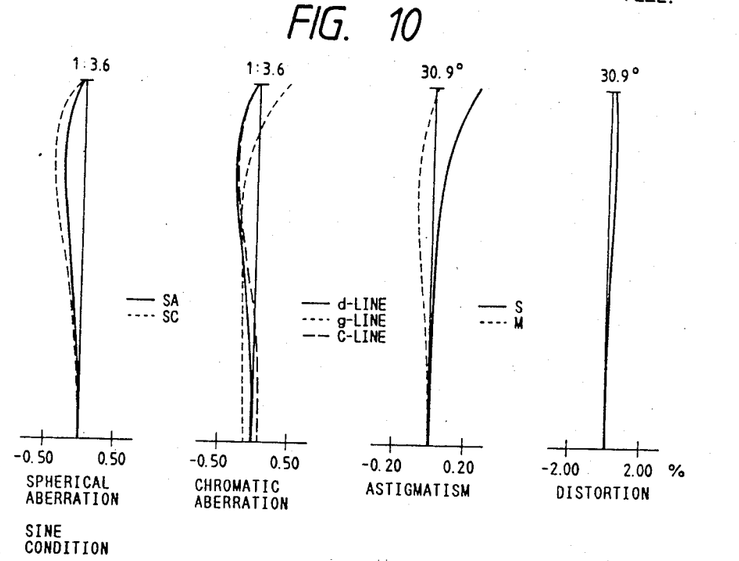
FIG. 10 is a graph plotting aberration curves obtained with the zoom lens system of Example 3 at the wide-angle end.
Figure 11:
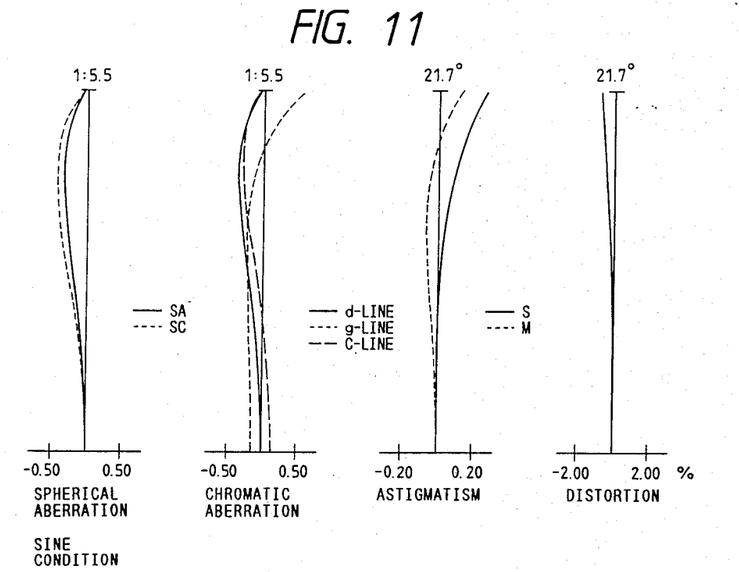
FIG. 11 is a graph plotting aberration curves obtained with the zoom lens system of Example 3 at a middle-angle position.

$F_{NO}=1:3.6\sim5.5\sim8.5$
$f=36.10\sim54.86\sim82.82$
$Z=2.29$
$\omega=30.9\sim21.7\sim14.7$
$f_B=10.10\sim27.55\sim53.40$

| Surface No. | r | d | N | $\nu$ |
|---|---|---|---|---|
| 1 | 30.112 | 1.74 | 1.72000 | 43.7 |
| 2 | 59.853 | 1.66 | | |
| 3 | −27.116 | 2.52 | 1.83481 | 42.7 |
| 4 | −118.294 | 0.65 | | |
| 5 | −28.304 | 7.00 | 1.73101 | 40.3 |
| 6 | −26.499 | 1.50~1.80~1.50 | | |
| 7 | 27.763 | 6.23 | 1.51823 | 59.0 |
| 8 | −10.138 | 2.09 | 1.80518 | 25.4 |
| 9 | −15.970 | 11.84~6.61~3.25 | | |
| 10 | −64.537 | 3.11 | 1.80518 | 25.4 |
| 11 | −18.162 | 1.41 | | |
| 12 | −18.954 | 1.30 | 1.83481 | 42.7 |
| 13 | −88.715 | 3.25 | | |
| 14 | −13.662 | 1.50 | 1.83400 | 37.2 |
| 15 | −51.629 | | | |

(1) $f_S/f_{1a}=0.166$
(2) $|\Delta|/f_S=0.0083$

Figure 8:
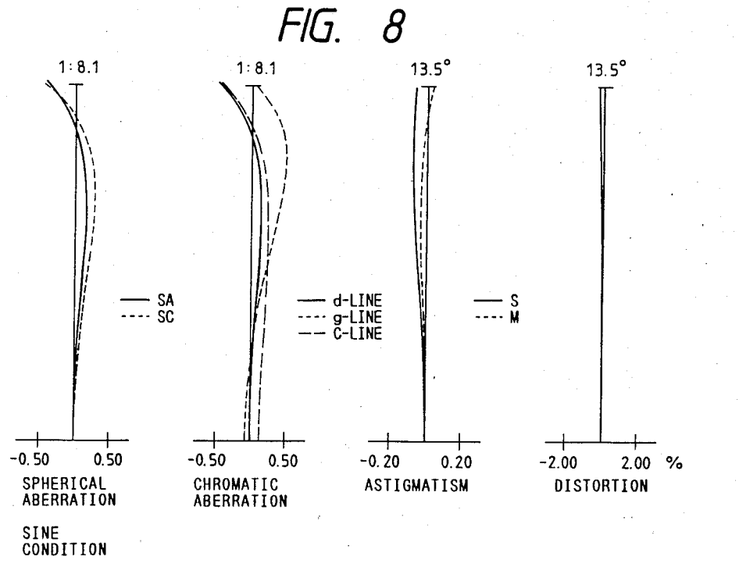
FIG. 8 is a graph plotting aberration curves obtained with the zoom lens system of Example 2 at the narrow-angle end.
Figure 12:
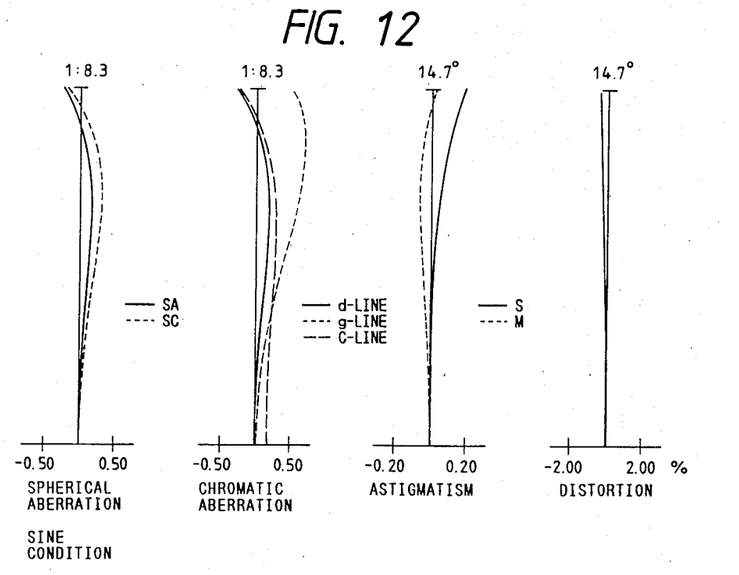
FIG. 12 is a graph plotting aberration curves obtained with the zoom lens system of Example 3 at the narrow-angle end.
Figure 13:
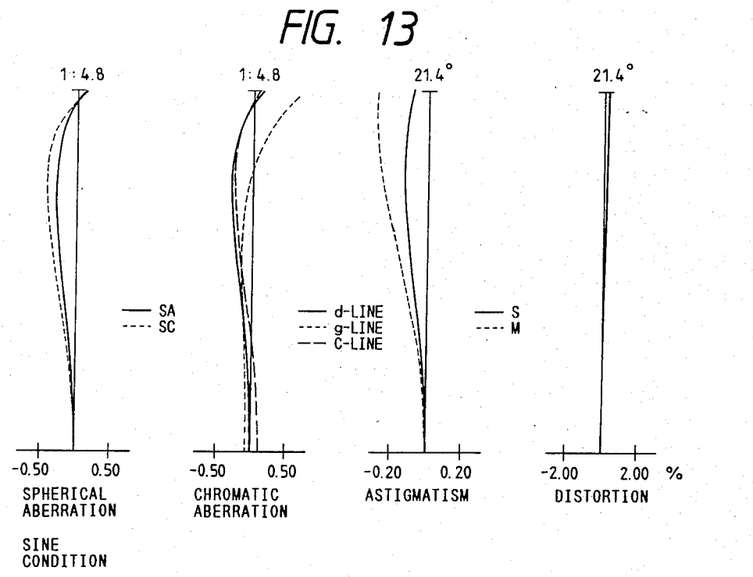
FIG. 13 is a graph plotting aberration curves obtained with the zoom lens system of Example 1 at a middle-angle position when lens subgroups 1a and 1b are moved en masse.
Figure 14:
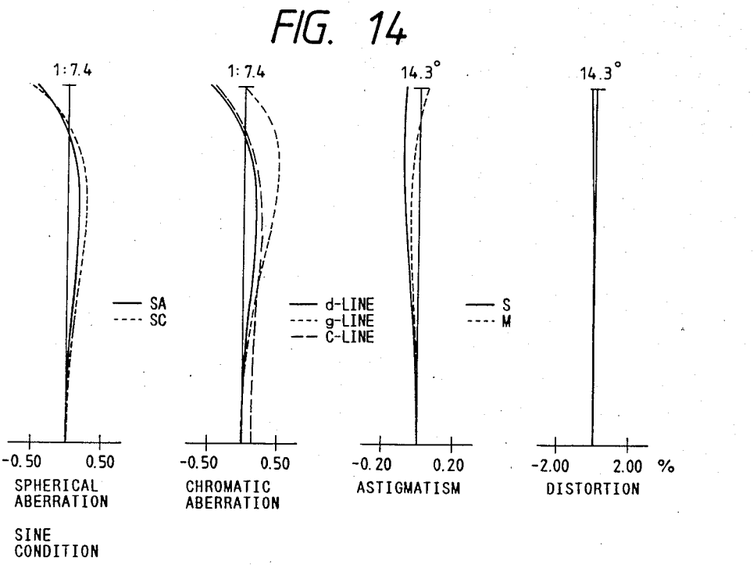
FIG. 14 is a graph plotting aberration curves obtained with the zoom lens system of Example 1 at the narrow-angle end when lens subgroups 1a and 1b are moved en masse.
Figure 15:
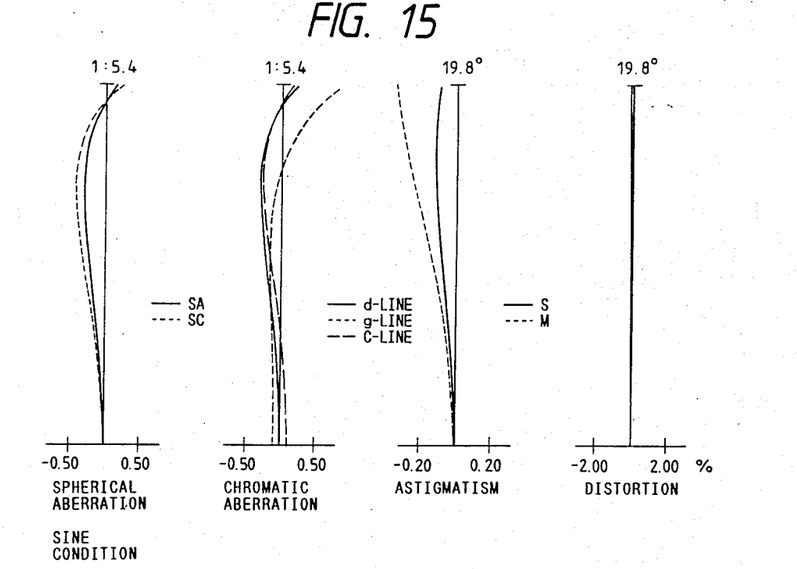
FIG. 15 is a graph plotting aberration curves obtained with the zoom lens system of Example 2 at a middle-angle position when lens subgroups 1a and 1b are moved en masse.
Figure 16:
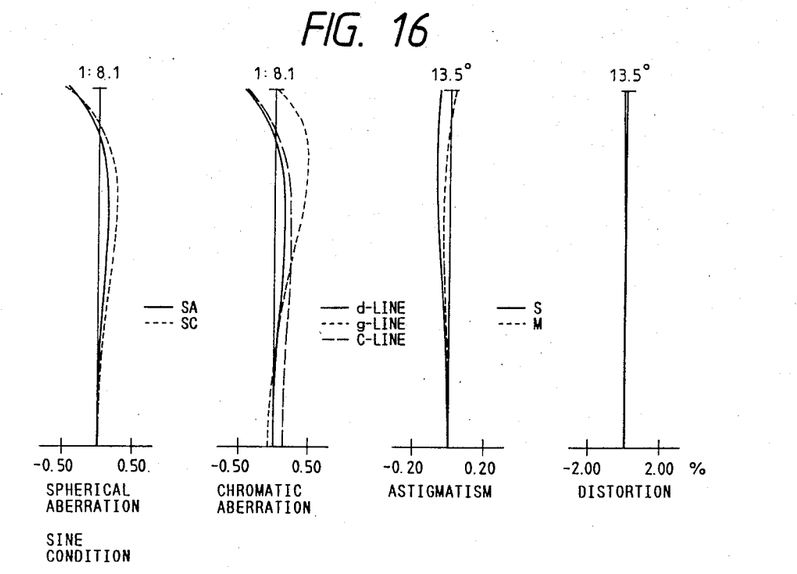
FIG. 16 is a graph plotting aberration curves obtained with the zoom lens system of Example 2 at the narrow-angle end when lens subgroups 1a and 1b are moved en masse.
Figure 17:
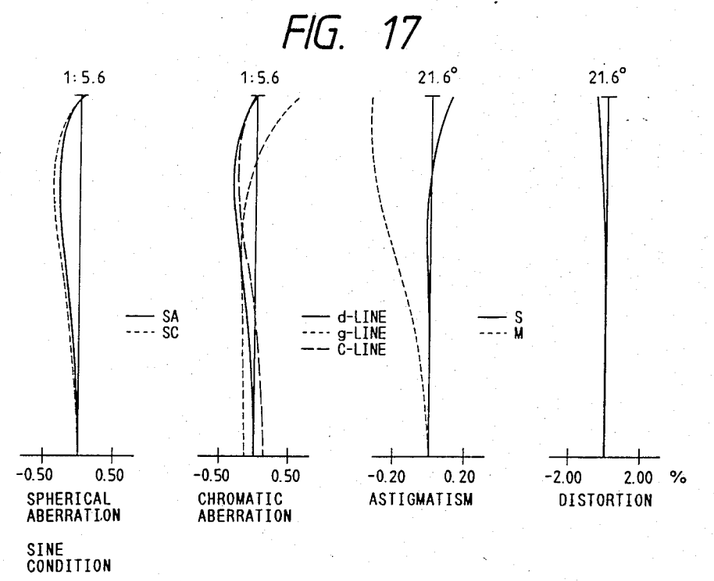
FIG. 17 is a graph plotting aberration curves obtained with the zoom lens system of Example 3 at the middle-angle position when lens subgroups 1a and 1b are moved en masse.
Figure 18:
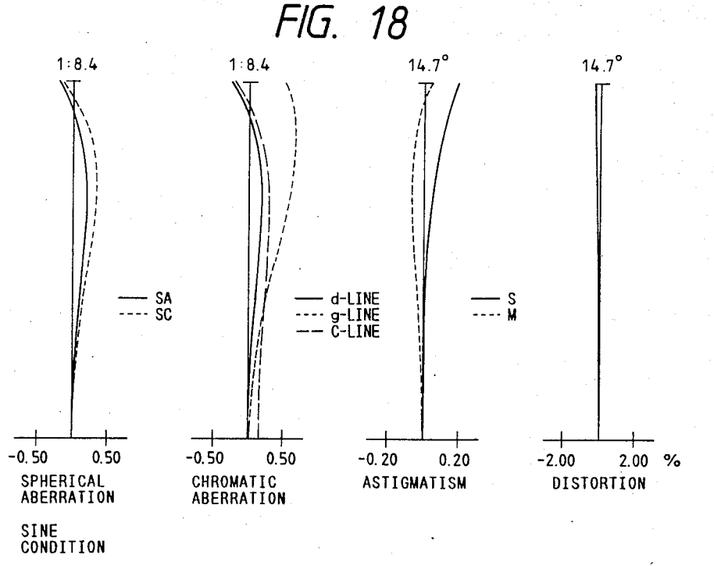
FIG. 18 is a graph plotting aberration curves obtained with the zoom lens system of Example 3 at the narrow-angle end when lens subgroups 1a and 1b are moved en masse.

In Examples 2 and 3, the distance between subgroups 1a and 1b at the narrow-angle end is the same as the distance at the wide-angle end, so that FIG. 8 and FIG. 12 are completely identical to FIG. 16 and FIG. 18, respectively. As described above, the zoom lens system of the present invention, which is suitable for use in a compact camera, is basically of two-group type, but differs from the prior art in that the first lens group is divided into two subgroups $1a$ and $1b$, the distance between which is adjusted during zooming. As a result, the inventive zoom lens system has an increased back focus and yet is reduced in overall length and is capable of attaining a high zoom ratio. The additional advantage of this system is that it experiences smaller variations in field curvature over the full zooming range.

What is claimed is:

1. In a high zoom-ratio zoom lens system for use in a compact camera which comprises, in order from the object side, a first lens group having a positive focal length and a second lens group having a negative focal length, and which performs zooming by adjusting the distance between the two lens groups, the improvement wherein said first lens group comprises a first lens subgroup having a small power and a second lens subgroup having a positive focal length, the distance between said two subgroups being increased during zooming from a wide-angle end to a normal position and decreased during zooming from said normal position to a telephoto end.

2. The zoom lens system according to claim 1, which satisfies the following condition:

$$|f_S/f_{1a}|<0.5$$

where $f_S$ is the focal length of the overall zoom lens system at said wide-angle end, and $f_{1a}$ is the focal length of said first lens subgroup.

3. The zoom lens system according to claim 1, which satisfies the following condition:

$$|\Delta|/f_S<0.1$$

where $\Delta$ is a maximum value of the change in the distance between said first and second lens subgroups.

4. The zoom lens system according to any one of claims 1-3, wherein said first lens subgroup comprises, in order from the object side, a positive meniscus lens element having a convex surface of large curvature directed toward the object, a negative lens element having a concave surface of large curvature directed toward the object, and a positive meniscus lens element having a convex surface of large curvature directed toward the image plane.

5. The zoom lens system according to any one of claims 1-3, wherein said second lens subgroup comprises a cemented positive lens having a divergent surface of large power and which comprises a biconvex positive lens element and a negative meniscus lens element having a concave surface of large curvature directed toward the object.

6. The zoom lens system according to any one of claims 1-3, wherein said second lens group comprises, in order from the object side, a positive lens element having a convex surface of large curvature directed toward the image plane and two negative meniscus lens elements having a concave surface of large curvature directed toward the object.

* * * * *